United States Patent
Dods

(10) Patent No.: US 11,032,318 B2
(45) Date of Patent: Jun. 8, 2021

(54) NETWORK MONITORING BASED ON DISTRIBUTION OF FALSE ACCOUNT CREDENTIALS

(71) Applicant: Juniper Networks, Inc., Sunnyvale, CA (US)

(72) Inventor: Craig Dods, Stittsville (CA)

(73) Assignee: Juniper Networks, Inc., Sunnyvale, CA (US)

( * ) Notice: Subject to any disclaimer, the term of this patent is extended or adjusted under 35 U.S.C. 154(b) by 320 days.

(21) Appl. No.: 16/055,665

(22) Filed: Aug. 6, 2018

(65) Prior Publication Data

US 2020/0045079 A1    Feb. 6, 2020

(51) Int. Cl.
*H04L 29/06* (2006.01)
*G06F 21/45* (2013.01)
*G06F 21/60* (2013.01)

(52) U.S. Cl.
CPC .......... *H04L 63/1491* (2013.01); *G06F 21/45* (2013.01); *G06F 21/604* (2013.01); *H04L 63/083* (2013.01); *H04L 63/101* (2013.01); *H04L 63/1425* (2013.01); *H04L 63/20* (2013.01); *G06F 2221/2127* (2013.01)

(58) Field of Classification Search
CPC ..... H04L 63/1491; G06F 21/45; G06F 21/604
See application file for complete search history.

(56) References Cited

U.S. PATENT DOCUMENTS

| 8,549,643 | B1* | 10/2013 | Shou | G06F 21/556 726/23 |
| 8,880,435 | B1* | 11/2014 | Catlett | G06Q 20/10 705/75 |
| 9,495,188 | B1* | 11/2016 | Ettema | H04L 63/20 |
| 9,516,059 | B1* | 12/2016 | Dotan | H04L 63/1491 |
| 9,774,627 | B2* | 9/2017 | Zeltser | G06F 21/57 |
| 2009/0241196 | A1* | 9/2009 | Troyansky | H04L 63/1491 726/25 |
| 2010/0118717 | A1* | 5/2010 | Suzuki | H04L 63/1491 370/252 |

(Continued)

FOREIGN PATENT DOCUMENTS

EP    2611106    1/2012

OTHER PUBLICATIONS

Extended European Search Report for Application No. EP19165932.5, dated Oct. 24, 2019, 9 pages.

*Primary Examiner* — Vance M Little
(74) *Attorney, Agent, or Firm* — Harrity & Harrity, LLP

(57) ABSTRACT

A device receives end user device information for end user devices associated with a network, and creates a data structure that includes the end user device information. The device creates a data structure that includes false account credentials, and maps the end user device information and the false account credentials to create a mapped data structure. The device provides the false account credentials to memory locations of corresponding ones of the end user devices, and provides information from the mapped data structure to one or more network devices associated with the network, wherein the information from the mapped data structure enables the one or more network devices to detect an unauthorized access attempt of the network using one or more of the false account credentials.

20 Claims, 14 Drawing Sheets

(56) References Cited

U.S. PATENT DOCUMENTS

| | | | |
|---|---|---|---|
| 2011/0214182 A1* | 9/2011 | Adams | G06F 21/54 |
| | | | 726/23 |
| 2013/0263226 A1 | 10/2013 | Sudia | |
| 2015/0013006 A1 | 1/2015 | Shulman et al. | |
| 2015/0047047 A1* | 2/2015 | Amoroso | H04L 61/35 |
| | | | 726/25 |
| 2016/0381023 A1 | 12/2016 | Dulce et al. | |
| 2017/0244672 A1 | 8/2017 | Shulman et al. | |
| 2017/0324777 A1 | 11/2017 | Ohayon et al. | |
| 2018/0007087 A1 | 1/2018 | Grady et al. | |
| 2018/0054461 A1* | 2/2018 | Dubs | G06F 21/16 |
| 2018/0103031 A1* | 4/2018 | Niemela | H04L 63/1433 |
| 2019/0123904 A1* | 4/2019 | Ackerman | G06F 21/45 |
| 2019/0245832 A1* | 8/2019 | Liu | H04L 63/0428 |
| 2019/0349369 A1* | 11/2019 | Bengtson | H04L 63/0281 |
| 2019/0356661 A1* | 11/2019 | Hecht | H04L 9/0891 |

* cited by examiner

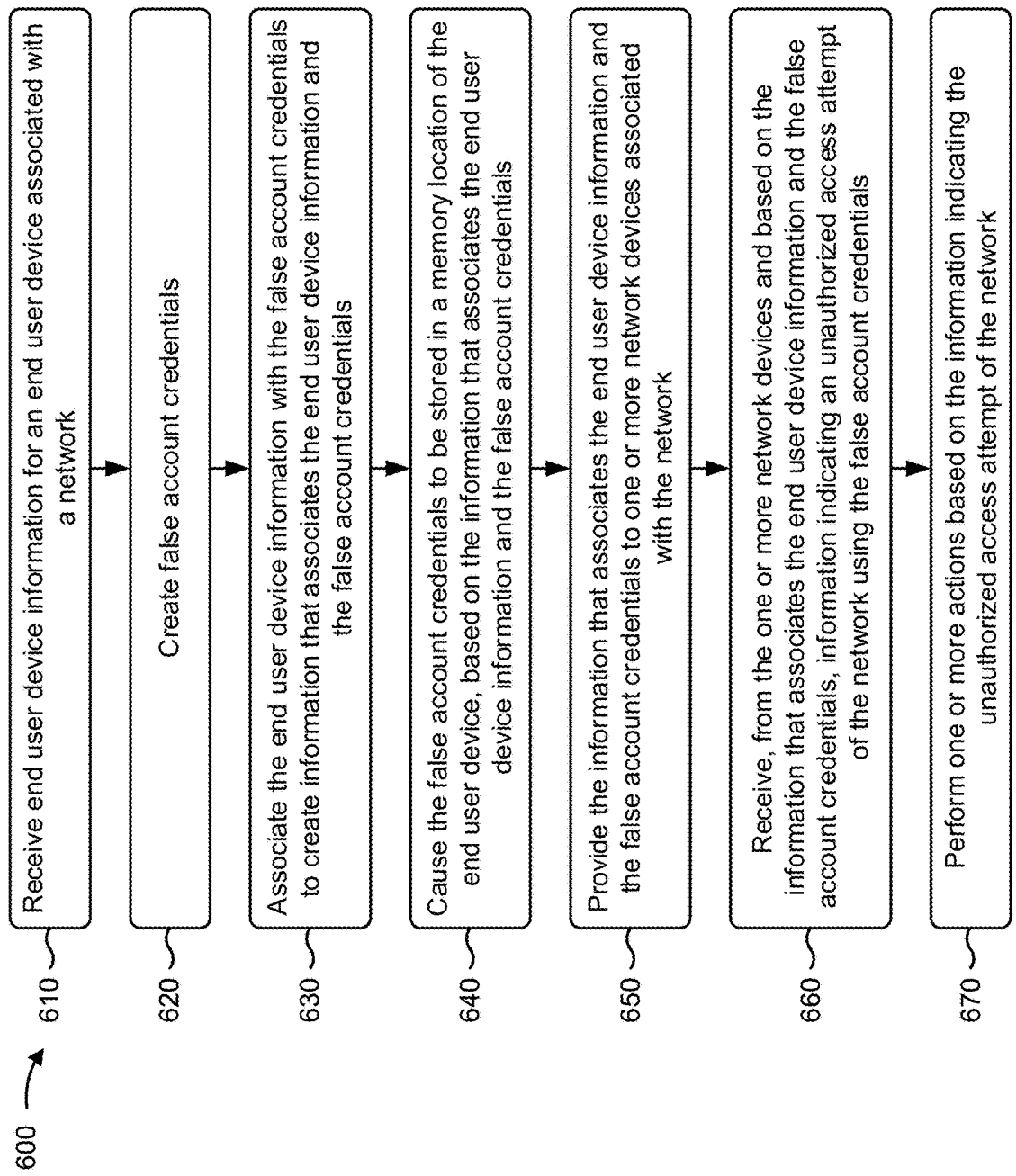

NETWORK MONITORING BASED ON DISTRIBUTION OF FALSE ACCOUNT CREDENTIALS

BACKGROUND

Identifying a network incident (e.g., a network intrusion, malware, firmware, and/or the like) is typically a time-consuming process for a network security team. Many products exist that attempt to lure or trap a bad actor (e.g., a network intruder) into revealing themselves, and that trigger a wide variety of actions from a network (e.g., blocking the network intruder, stopping malware and/or firmware, and/or the like).

SUMMARY

According to some implementations, a device may include one or more memories, and one or more processors to receive end user device information for end user devices associated with a network, and create a data structure that includes the end user device information. The one or more processors may create a data structure that includes false account credentials, and may map the end user device information and the false account credentials to create a mapped data structure. The one or more processors may provide the false account credentials to memory locations of corresponding ones of the end user devices, and may provide information from the mapped data structure to one or more network devices associated with the network, wherein the information from the mapped data structure enables the one or more network devices to detect an unauthorized access attempt of the network using one or more of the false account credentials.

According to some implementations, a non-transitory computer-readable medium may store instructions including one or more instructions that, when executed by one or more processors, cause the one or more processors to receive end user device information for end user devices associated with a network, and create false account credentials. The one or more instructions may cause the one or more processors to correlate the end user device information, associated with each of the end user devices, with a different one of the false account credentials to create a data structure that correlates the end user device information and the false account credentials. The one or more instructions may cause the one or more processors to cause the false account credentials to be stored in memory locations of corresponding ones of the end user devices, and provide information from the data structure to one or more network devices associated with the network. The one or more instructions may cause the one or more processors to receive, from the one or more network devices and based on the information from the data structure, information indicating an unauthorized access attempt of the network using one or more of the false account credentials, and perform one or more actions based on the information indicating the unauthorized access attempt of the network.

According to some implementations, a method may include receiving end user device information for an end user device associated with a network, and creating false account credentials. The method may include associating the end user device information with the false account credentials to create information that associates the end user device information and the false account credentials, and causing the false account credentials to be stored in a memory location of the end user device, based on the information that associates the end user device information and the false account credentials. The method may include providing the information that associates the end user device information and the false account credentials to one or more network devices associated with the network, and receiving, from the one or more network devices and based on the information that associates the end user device information and the false account credentials, information indicating an unauthorized access attempt of the network using the false account credentials. The method may include performing one or more actions based on the information indicating the unauthorized access attempt of the network.

BRIEF DESCRIPTION OF THE DRAWINGS

FIGS. 4-6 are flow charts of example processes for network monitoring based on distribution of false account credentials.

DETAILED DESCRIPTION

The following detailed description of example implementations refers to the accompanying drawings. The same reference numbers in different drawings may identify the same or similar elements.

A network incident, such as a network intrusion, malware, firmware, and/or the like, may be caused by a bad actor (e.g., a network intruder) based on stolen network account credentials. The network incident and/or the bad actor may be addressed if the network incident and/or the bad actor are identified. However, detecting a bad actor may be difficult and time consuming, especially for advanced bad actors, such as bad actors stealing network account credentials from memories of network endpoint devices.

Some implementations described herein provide a security platform that provides network monitoring based on distribution of false account credentials. For example, the security platform may receive end user device information for end user devices associated with a network, and may create false account credentials. The security platform may correlate the end user device information, associated with each of the end user devices, with a different one of the false account credentials to create a data structure that correlates the end user device information and the false account credentials. The security platform may cause the false account credentials to be stored in memory locations of corresponding ones of the end user devices, based on the data structure, and may provide information from the data structure to one or more network devices associated with the network. The security platform may receive, from the one or more network devices and based on the information from the data structure, information indicating an unauthorized access attempt of the network using one or more of the false account credentials, and may perform one or more actions based on the information indicating the unauthorized access attempt of the network.

In this way, the security platform may reduce the time it takes to identify bad actors, and may conserve resources (e.g., processor resources, memory resources, and/or the like) utilized to identify the bad actors. The security platform may also increase a likelihood of identifying an advanced bad actor (e.g., a bad actor stealing network account credentials from memories of network endpoint devices) by tempting the advanced bad actor, who has already comprised a network endpoint device, to reach out to other network endpoint devices or services on the network using the false account credentials.

Figure 1A:
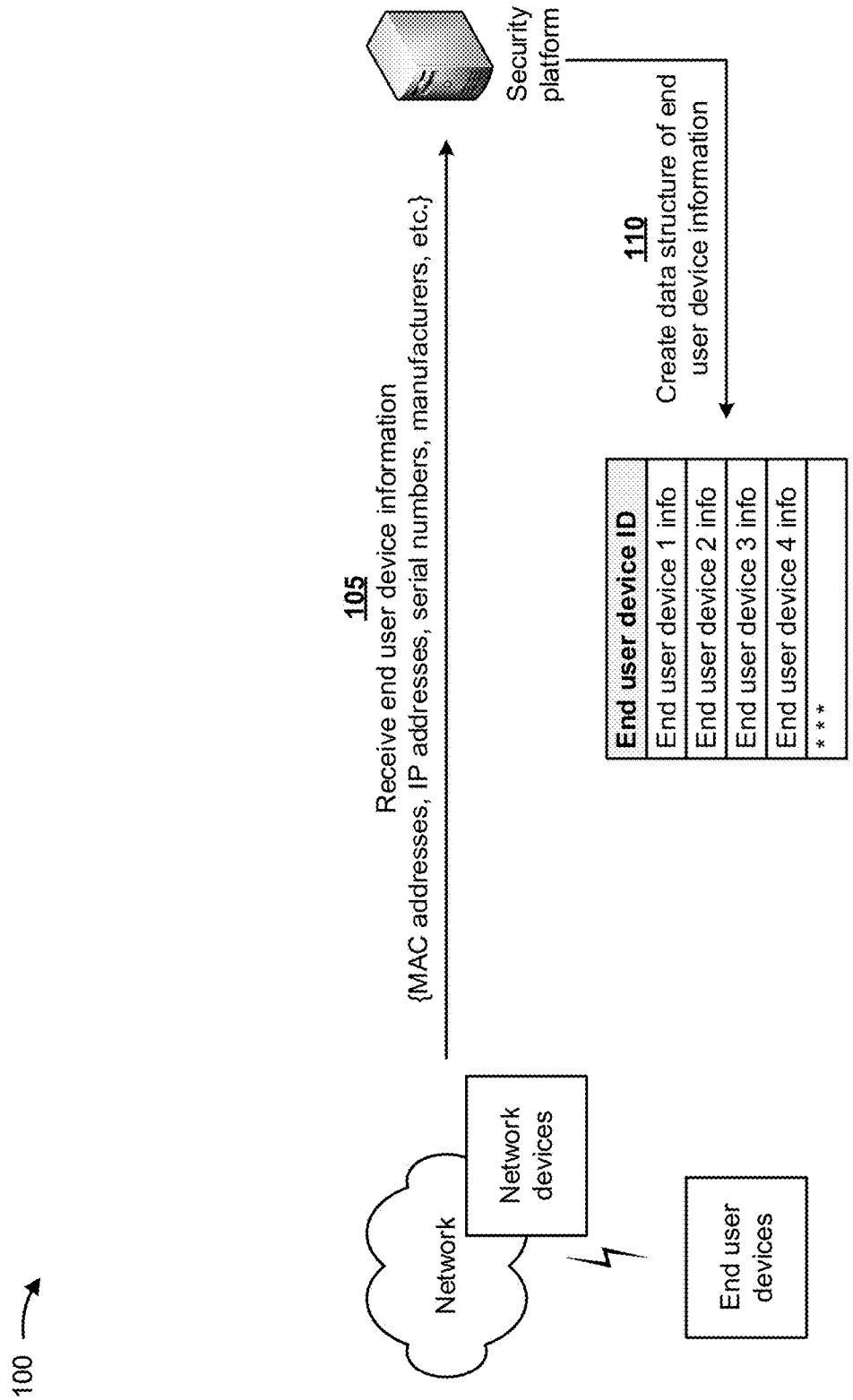
FIGS. 1A-1I are diagrams of an example implementation described herein.

FIGS. 1A-1I are diagrams of an example implementation 100 described herein. As shown in FIG. 1A, a network may be associated with a security platform. As further shown in FIG. 1A, the network may include multiple network devices and multiple end user devices. In some implementations, the end user devices may include account credentials associated with users of the end user devices, and the users may utilize the account credentials to access (e.g., via the multiple network devices) the network (e.g., gain access to the network, a service available via the network, a website available via the network, and/or the like). In some implementations, the account credentials may include a username, a password, a personal identification number, a keyword, and/or the like.

As further shown in FIG. 1A, and by reference number 105, the security platform may receive, from the network, end user device information associated with the end user devices of the network. In some implementations, the end user device information, for an end user device, may include a media access control (MAC) address associated with the end user device, an Internet protocol (IP) address associated with the end user device, a serial number associated with the end user device, information identifying a manufacturer associated with the end user device, information identifying a make or model associated with the end user device, and/or the like.

As further shown in FIG. 1A, and by reference number 110, the security platform may create a data structure (e.g., a database, a table, a list, and/or the like) based on the end user device information. In some implementations, the data structure may include end user device identifier (ID) information associated with each of the end user devices. For example, as shown in FIG. 1A, the data structure may include first end user device information (e.g., end user device information 1, such as a MAC address, an IP address, a serial number, a manufacturer, a make, a model, and/or the like associated with a first end user device) to identify the first end user device; second end user device information (e.g., end user device information 2, such as a MAC address, an IP address, a serial number, a manufacturer, a make, a model, and/or the like associated with a second end user device) to identify the second end user device; third end user device information (e.g., end user device information 3, such as a MAC address, an IP address, a serial number, a manufacturer, a make, a model, and/or the like associated with a third end user device) to identify the third end user device; fourth end user device information (e.g., end user device information 4, such as a MAC address, an IP address, a serial number, a manufacturer, a make, a model, and/or the like associated with a fourth end user device) to identify the fourth end user device; and/or the like. In some implementations, the end user device information may include a single identifier (e.g., a MAC address, an IP address, or a serial number) that is associated with and used to identify a single end user device.

Figure 1B:
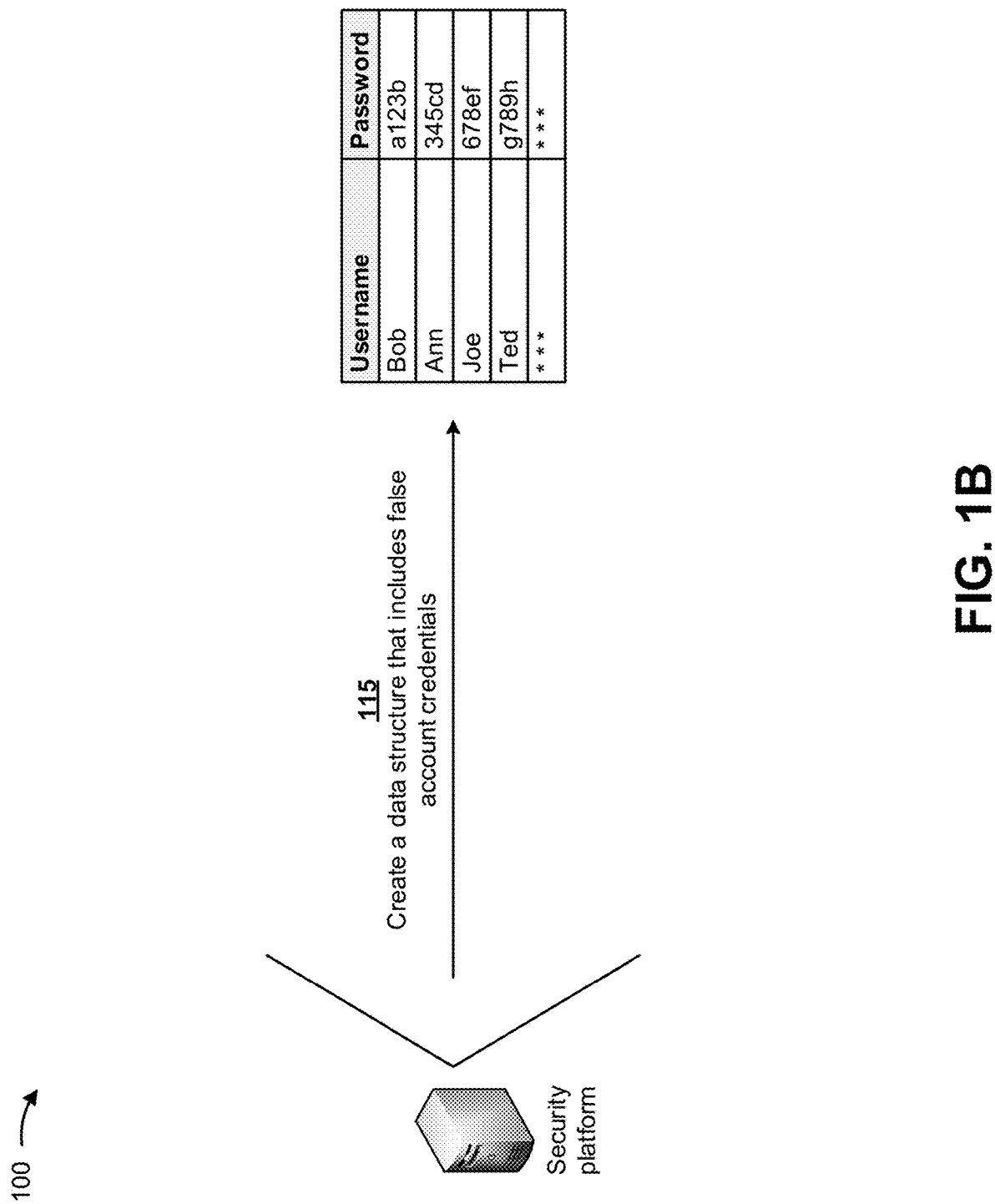

As shown in FIG. 1B, and by reference number 115, the security platform may create a data structure (e.g., a database, a table, a list, and/or the like) that includes false account credentials. In some implementations, the false account credentials may include credentials that are similar to credentials utilized to access the network (e.g., gain access to the network, a service available via the network, a website accessible via the network, and/or the like) (e.g., a username and a password), but which are not legitimate credentials to be used to access the network. Rather, the false account credentials may be utilized by the security platform to identify bad actors, to increase a likelihood of identifying an advanced bad actor by tempting the advanced bad actor, who has already comprised a network endpoint device, to reach out to other network endpoint devices or services on the network using the false account credentials, and/or the like. In some implementations, the false account credentials may include one or more of usernames, passwords, account identifiers, personal identification numbers, keywords, and/or the like.

Figure 1C:
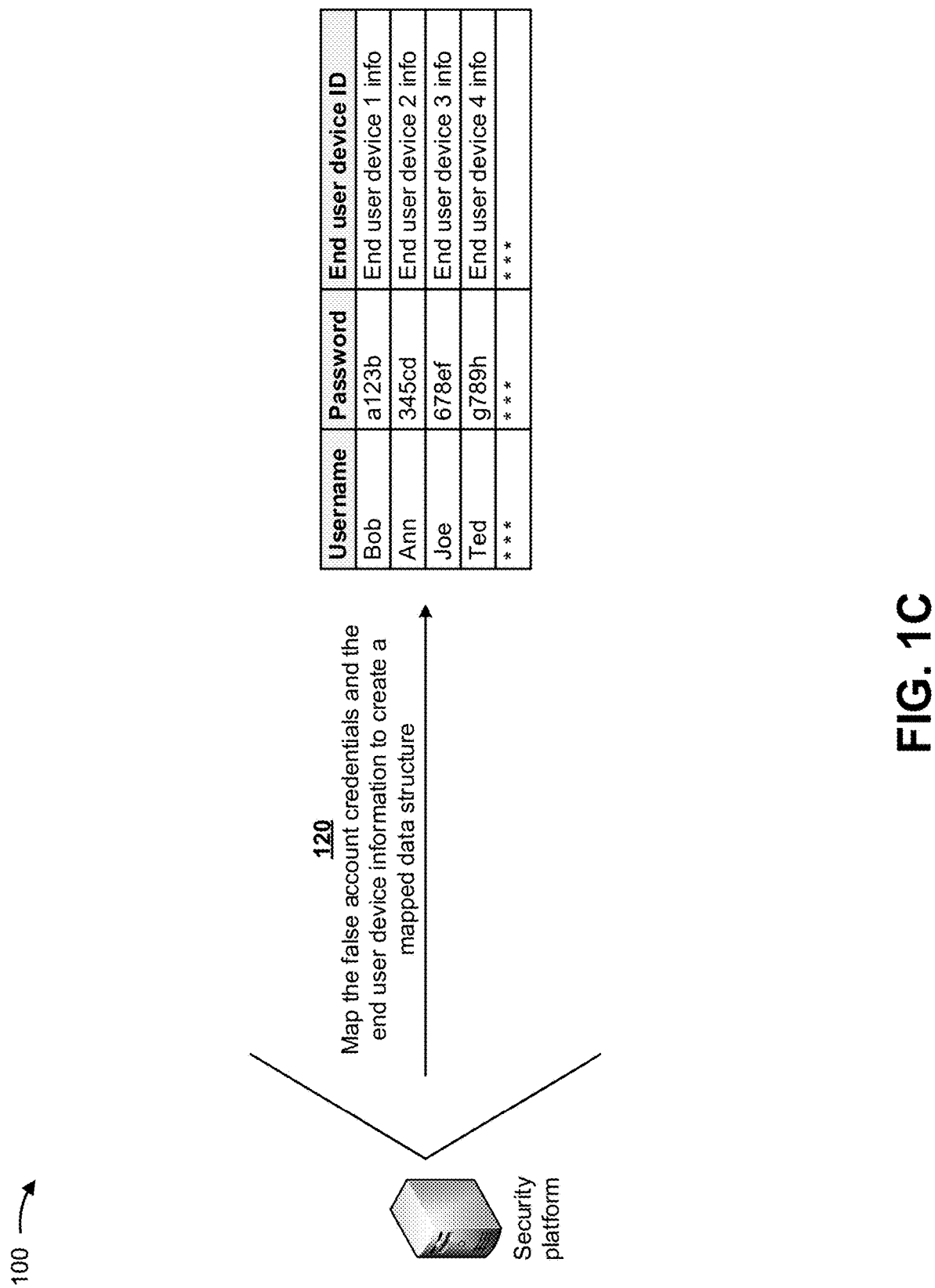

As shown in FIG. 1C, and by reference number 120, the security platform may map the false account credentials and the end user device information to create a mapped data structure (e.g., a database, a table, a list, and/or the like). In some implementations, the security platform may provide a one-to-one mapping of the end user device information (e.g., a MAC address, an IP address, a serial number, a manufacturer, a make, a model, and/or the like associated with an end user device) to particular false account credentials. For example, as shown in FIG. 1C, the first false account credentials (e.g., username=Bob and password=a123b) may be mapped, correlated, and/or associated with the first end user device information (e.g., end user device information 1); the second false account credentials (e.g., username=Ann and password=345cd) may be mapped, correlated, and/or associated with the second end user device information (e.g., end user device information 2); the third false account credentials (e.g., username=Joe and password=678ef) may be mapped, correlated, and/or associated with the third end user device information (e.g., end user device information 3); the fourth false account credentials (e.g., username=Ted and password=g789h) may be mapped, correlated, and/or associated with the fourth end user device information (e.g., end user device information 4); and/or the like. In this way, the security platform may enable network administrators and network devices to quickly and easily identify an end user device that has been comprised (e.g., from which the false account credentials have been stolen). For example, if a network device identifies a username of Bob and a password of a123b, a network device may immediately determine that those false account credentials were stolen from the first end user device because those false account credentials were associated with the first end user device in the mapped data structure.

While FIG. 1C shows one false account credential associated with one end user device, in some implementations, multiple (e.g., two, ten, one-hundred, one-thousand, etc.) false account credentials may be associated with one end user device. For example, the security platform may associate thousands of false account credentials with a single end user device, which may enable the network devices to monitor for any of the thousands of false account credentials to determine that the single end user device has been compromised.

Figure 1D:
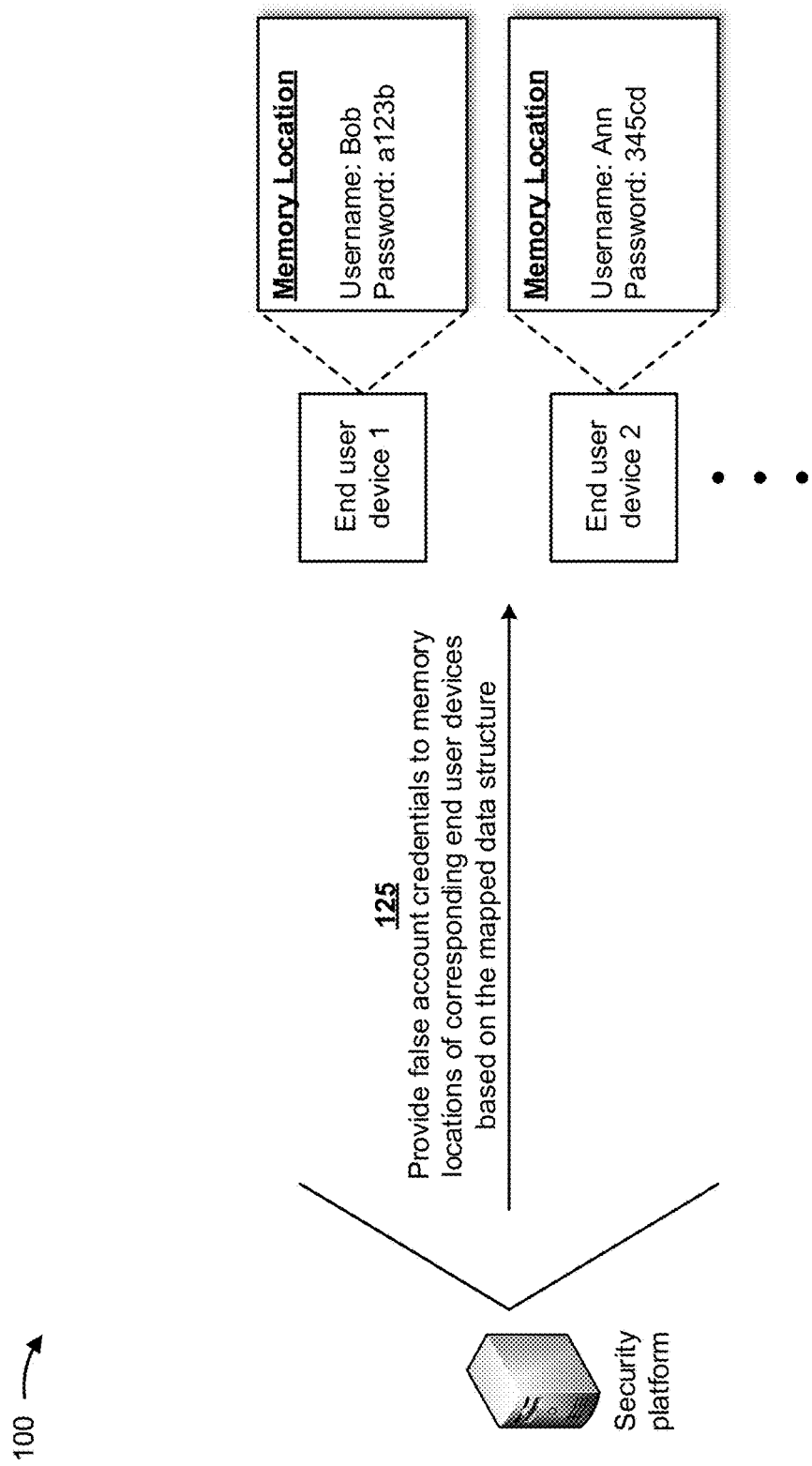

As shown in FIG. 1D, and by reference number 125, the security platform may provide the false account credentials to memory locations of corresponding end user devices based on the mapped data structure. In some implementations, the security platform may provide, to the corresponding end user devices, the false account credentials and an instruction to store the false account credentials in the memory locations, and the corresponding end user devices may store the false account credentials in the memory locations based on the instruction. In some implementations, based on the mapped data structure, the security platform may provide the first false account credentials (e.g., username=Bob and password=a123b) to the first end user device (e.g., end user device 1), the second false account credentials (e.g., username=Ann and password=345cd) to the second end user device (e.g., end user device 2), the third false account credentials (e.g., username=Joe and password=678ef) to the third end user device (e.g., end user device 3), the fourth false account credentials (e.g., username=Ted and password=g789h) to the fourth end user device (e.g., end user device 4), and/or the like. The end user devices may receive the false account credentials, and may store the false account credentials in the memory locations. In some implementations, the security platform may remotely and at scale (e.g., via a task automation and configuration management framework, such as PowerShell) store the false account credentials in the memory locations of end user devices.

In some implementations, the memory locations may include specific memory locations within operating systems of the end user devices. For example, the memory locations may include memory locations (e.g., local security authority subsystem service (LSASS) and/or the like) capable of being accessed by memory dumping tools (e.g., Mimikatz, Sekurlsa, and/or the like). In some implementations, if the false account credentials are only accessible via memory dumping tools, a likelihood of false positive network incidents being triggered based on usage of the false account credentials may be minimized. Furthermore, this may ensure that identified network incidents (e.g., end user devices being comprised) are being caused by an actor of reasonable skill since stealing account credentials from memory is difficult.

Figure 1E:
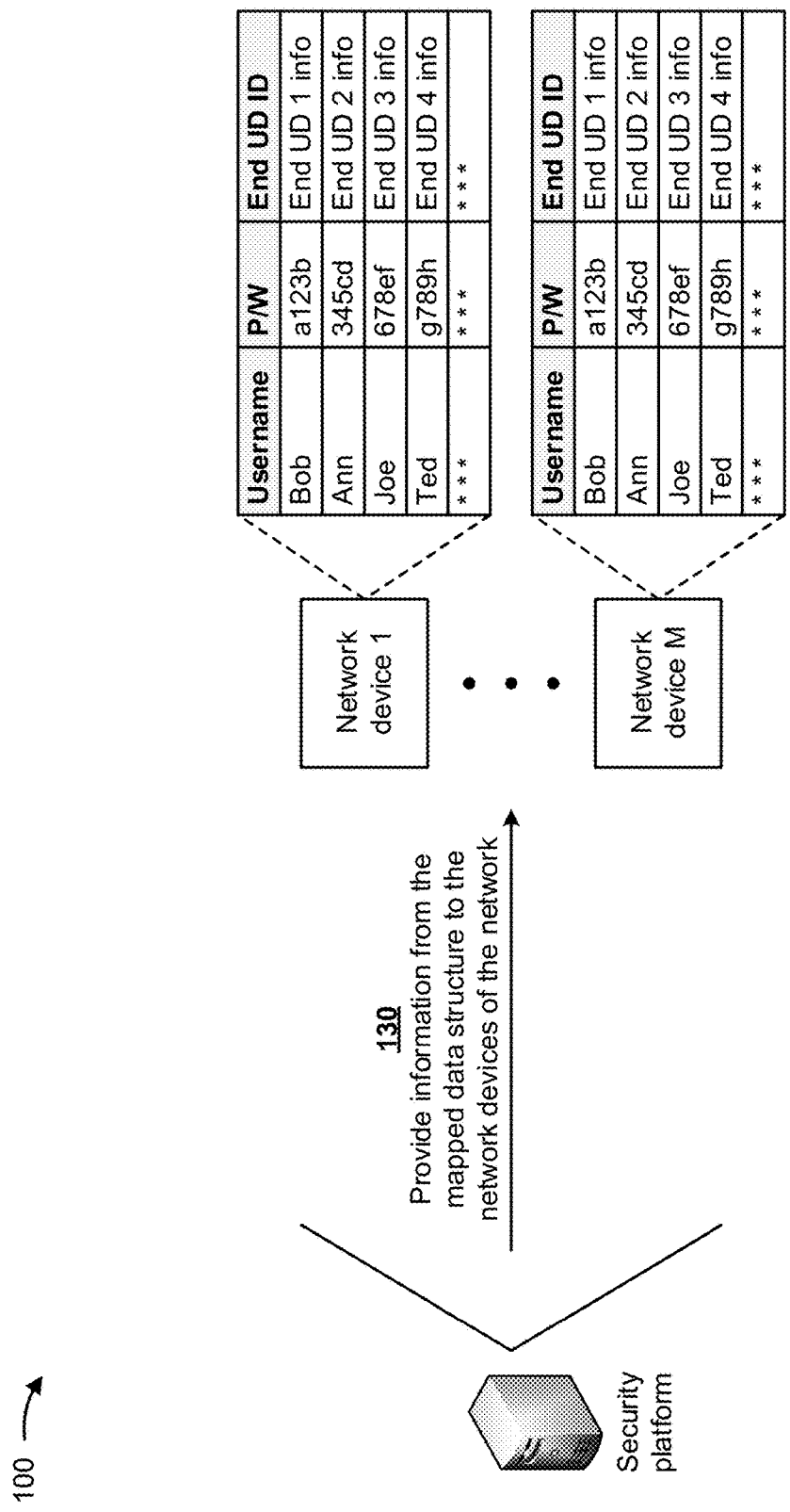

As shown in FIG. 1E, and by reference number 130, the security platform may provide information from the mapped data structure to the network devices (e.g., network device 1 to network device M, where M is an integer greater than or equal to one) of the network. In some implementations, the security platform may provide the information from the mapped data structure to other network devices associated with the network, such as an intrusion detection system, a network monitoring device, a firewall, a gateway, and/or the like. In some implementations, the network devices may store the information from the mapped data structure (e.g., in memory associated with such network devices). In some implementations, the information from the mapped data structure may include the one-to-one mappings of the end user device information to the false account credentials, as described above in connection with FIG. 1C.

In this way, the network devices may utilize the information from the mapped data structure to analyze information received during access attempts associated with the network (e.g., credentials provided during the access attempts). The network devices may identify when false account credentials are being utilized during the access attempts based on analyzing the information received during the access attempts. If false account credentials are detected, a network device may determine an end user device associated with the false account credentials based on the information from the mapped data structure.

In some implementations, when use of the false account credentials is detected, the network device may perform one or more actions based on the false account credentials. For example, the network device may provide an address, of the end user device associated with the false account credentials, to a blacklist so that the end user device may be prevented from accessing the network. The network device may prevent the end user device associated with the false account credentials from accessing the network since the end user device has been comprised. The network device may modify security rules associated with one or more of the network devices so that the network devices may increase security associated with accessing the network. The network device may modify rules for a network device (e.g., an intrusion prevention system) associated with the network to increase security associated with accessing the network. The network device may push a security update to the compromised end user device so that the end user device may be better protected from a bad actor. The network device may cause the end user device to initiate a malware and/or a virus scan to ensure that the end user device is not infected with malware and/or a virus. The network device may cause the end user device to be taken offline (e.g., disconnect from the network) so that the end user device may not harm the network. The network device may send a notification for display on the end user device (e.g., to inform a user that the end user device has been compromised).

In some implementations, the security platform may provide the false account credentials to the network devices, but may not provide the end user device information to the network devices. In such implementations, the network devices may notify the security platform when a false account credential is utilized, and the security platform may utilize the false account credential to identify the comprised end user device.

Figure 1F:
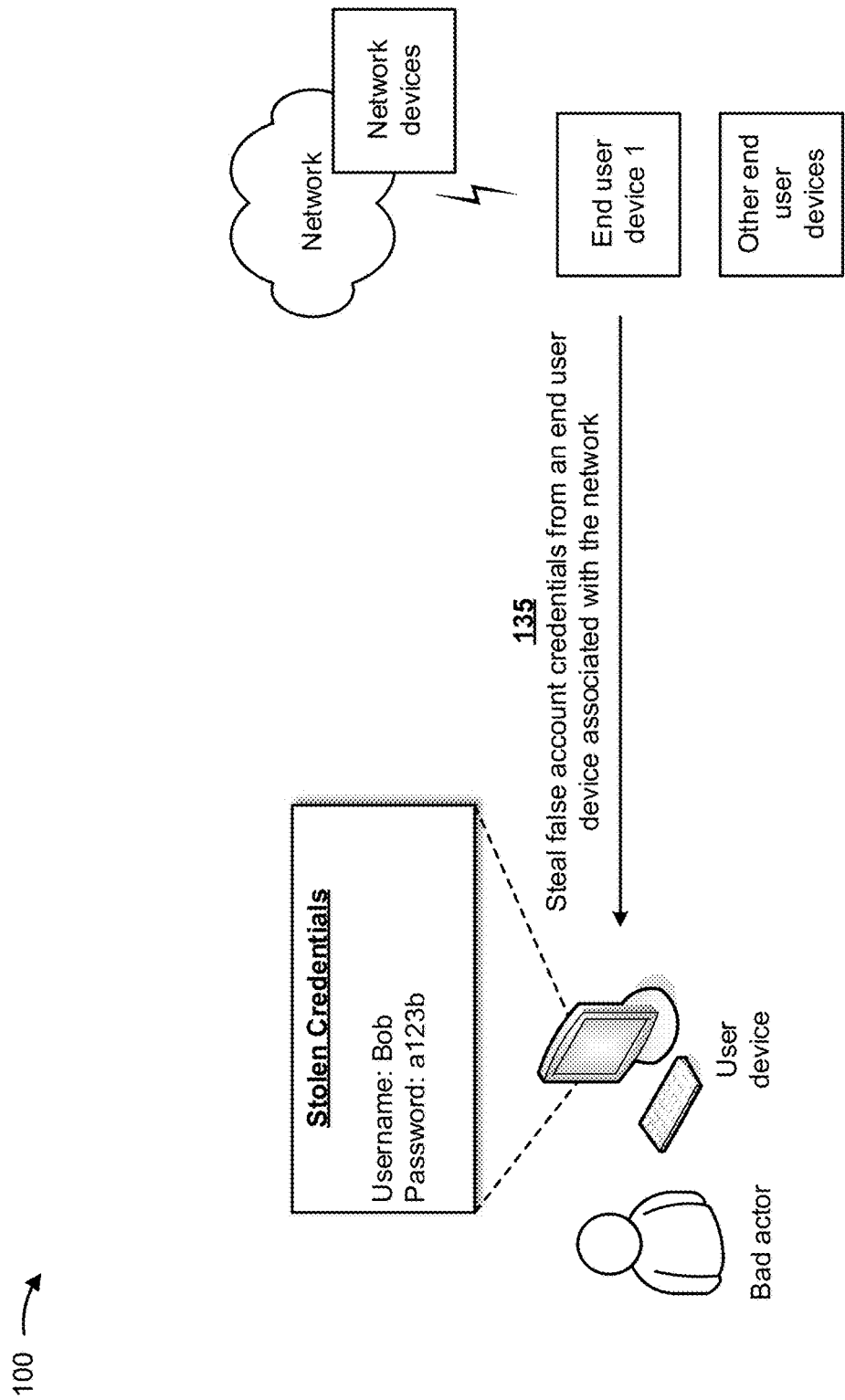

As shown in FIG. 1F, and by reference number 135, a bad actor, associated with a user device, may utilize the user device to steal false account credentials from an end user device associated with the network. For example, as shown, the bad actor may utilize the user device to steal the false account credentials (e.g., username=Bob and password=a123b) associated with the first end user device (e.g., end user device 1). In some implementations, the user device may utilize a memory dumping tool (e.g., Mimikatz, Sekurlsa, and/or the like) to access the memory location of the first end user device (e.g., where the false account credentials are stored) and retrieve the false account credentials. In some implementations, the bad actor may utilize the user device to steal one or more other false account credentials from one or more other end user devices in a similar manner.

Figure 1G:
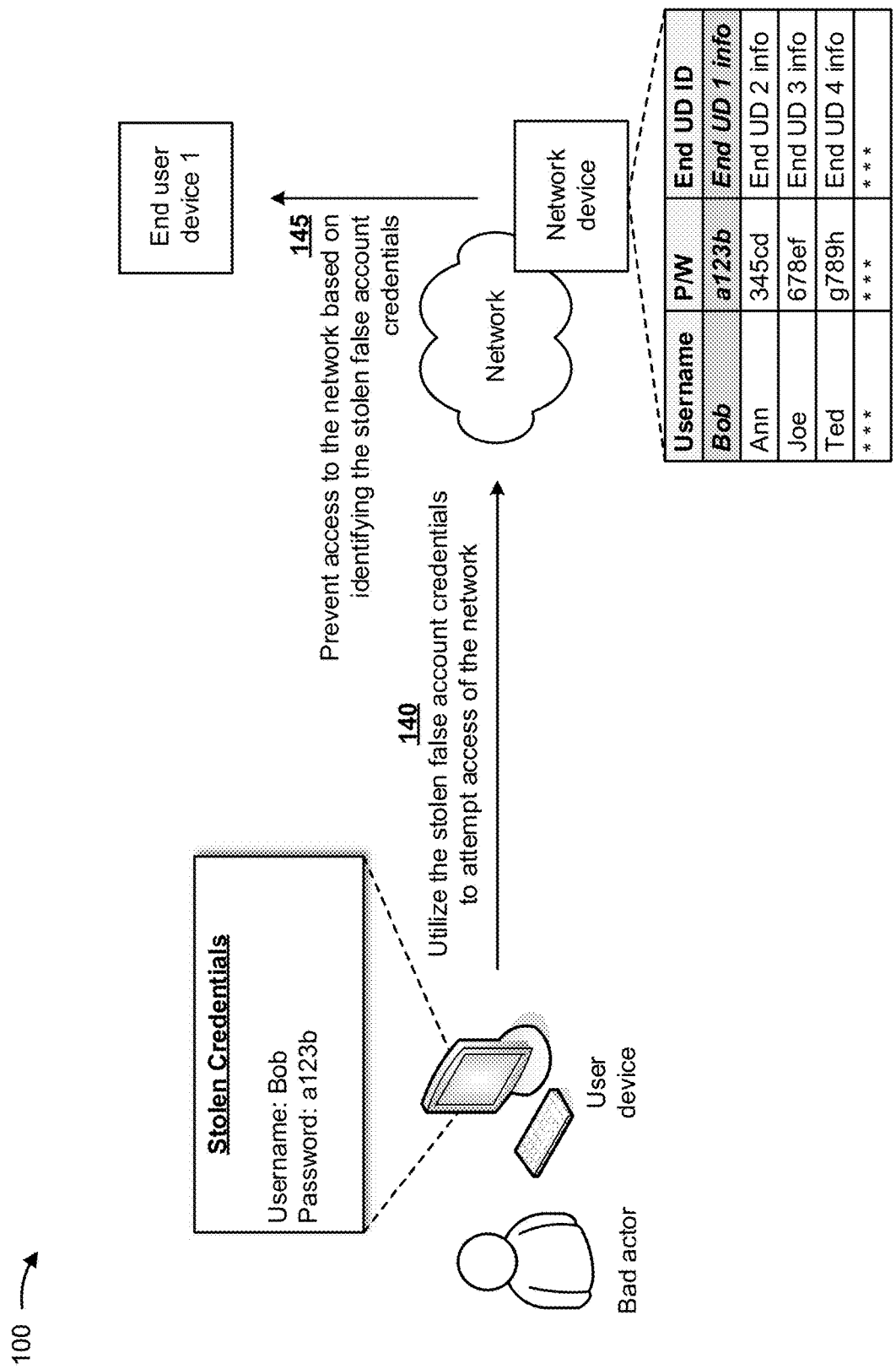

As shown in FIG. 1G, and by reference number 140, the bad actor may utilize the user device and the stolen false account credentials to attempt access of the network (e.g., gain access to the network, to a service available via the network, to a website accessible via the network, and/or the like). In some implementations, the bad actor may cause the user device to provide the stolen false account credentials (e.g., username=Bob and password=a123b) to a network device of the network. The network device may receive the stolen false account credentials, and may analyze the stolen false account credentials. The network device may determine that false account credentials are being utilized during the attempt to access the network based on analyzing the stolen false account credentials. For example, the network device may determine that false account credentials are being utilized since the stolen false account credentials match an entry in the information from the mapped data structure. The network device may determine the end user device (e.g., the first end user device) associated with the stolen false account credentials based on the information from the mapped data structure.

As further shown in FIG. 1G, and by reference number 145, the network device may prevent the first end user device from accessing the network based on identifying the stolen false account credentials and determining that the first end user device is compromised. In some implementations, the network device may perform one or more actions based on identifying the stolen false account credentials, such as providing an address of the first end user device to a blacklist, modifying security rules associated with one or more network devices, modifying rules for a network device (e.g., an intrusion prevention system) associated with the network, pushing a security update to the first end user device, causing the first end user device to initiate a malware and/or a virus scan, causing the end user device to be taken offline, sending a notification for display on the first end user device, and/or the like.

Figure 1H:
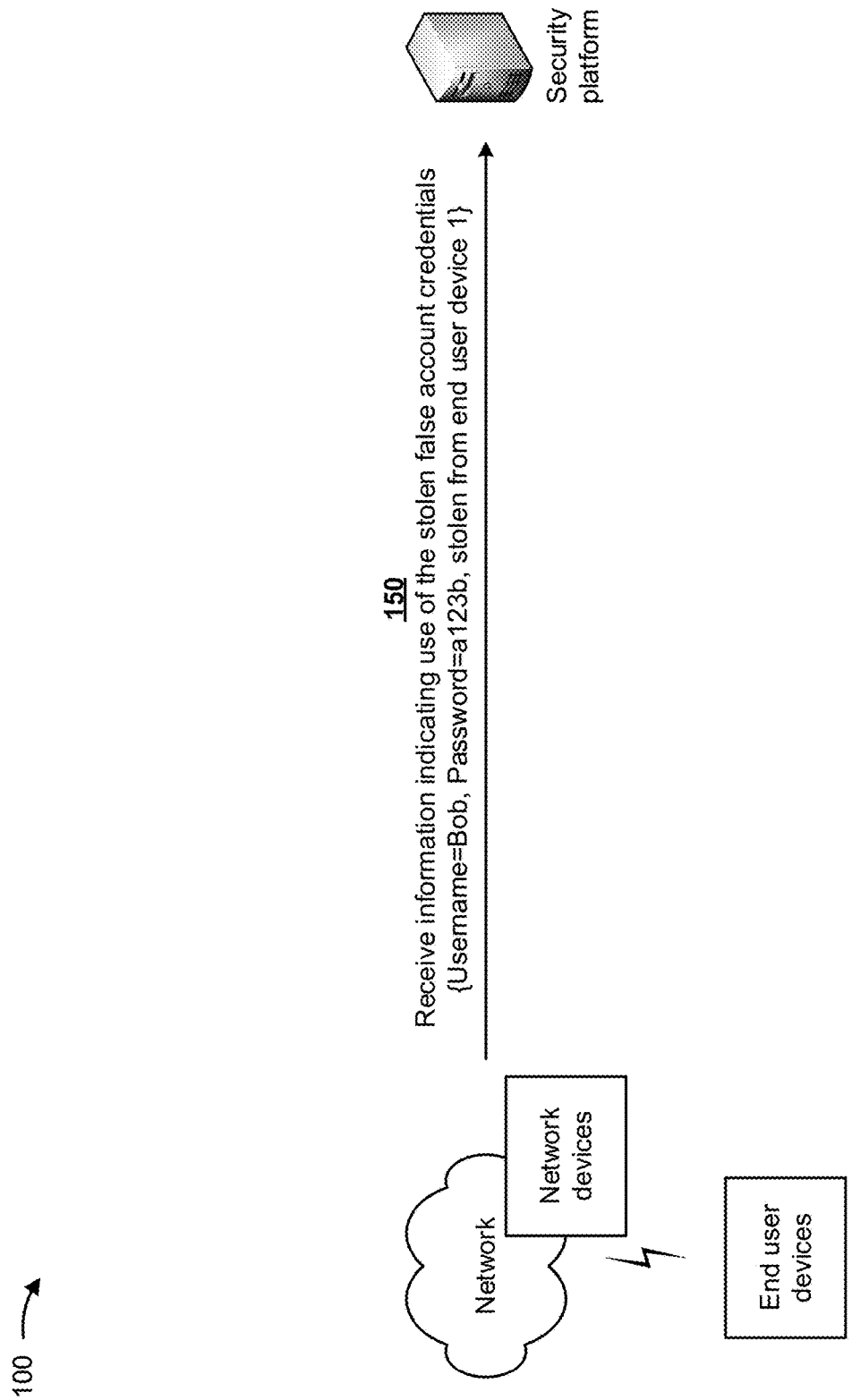

As shown in FIG. 1H, and by reference number 150, the security platform may receive, from the network device, information indicating use of the stolen false account credentials. In some implementations, the information indicating use of the stolen false account credentials may include information identifying the stolen false account credentials (e.g., username=Bob and password=a123b), information identifying an end user device (e.g., the first end user device) from which the false account credentials were stolen, and/or the like. In some implementations, the security platform may receive, from the network device, information identifying the stolen false account credentials, and may utilize the stolen false account credentials to identify the end user device associated with the stolen false account credentials. In some implementations, the security platform may receive, from the network device, information identifying an end user device (e.g., the first end user device) from which the false account credentials were stolen.

Figure 1I:
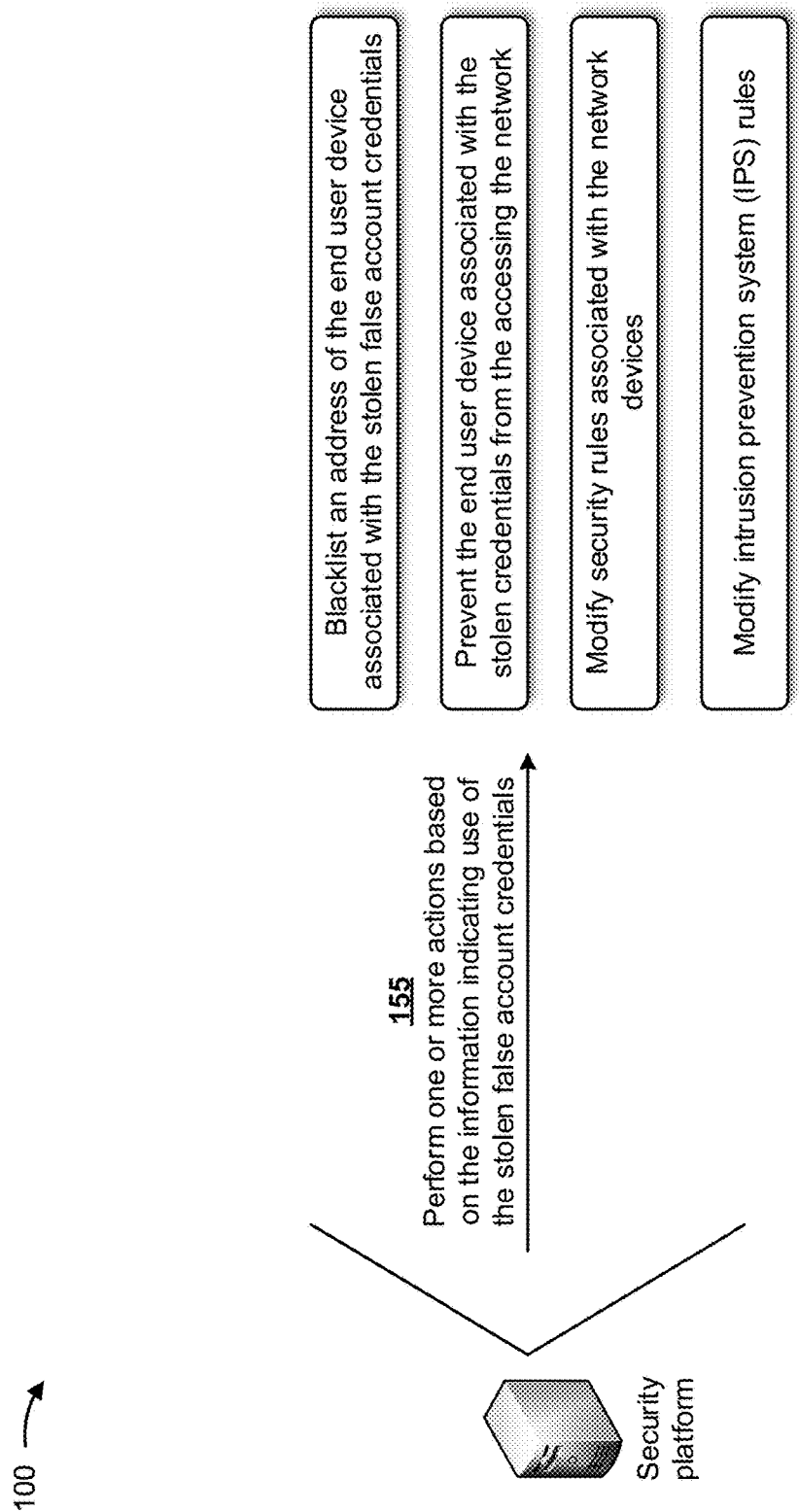

As shown in FIG. 1I, and by reference number 155, the security platform may perform one or more actions based on the information indicating use of the stolen false account credentials. For example, the security platform may blacklist an address (e.g., an IP address) of an end user device (e.g., the first end user device) associated with the stolen false account credentials so that the end user device may be prevented from accessing the network. The security platform may prevent the end user device associated with the stolen false account credentials from accessing the network since the end user device has been comprised. The security platform may modify security rules associated with the one or more network devices so that the network devices may increase security associated with accessing the network. The security platform may modify rules for a network device (e.g., an intrusion prevention system) associated with the network to increase security associated with accessing the network. The security platform may push a security update to the compromised end user device so that the end user device may be better protected from a bad actor. The security platform may cause the end user device to initiate a malware and/or a virus scan to ensure that the end user device is not infected with malware and/or a virus. The security platform may cause the end user device to be taken offline (e.g., disconnect from the network) so that the end user device may not harm the network. The security platform may send a notification for display on the end user device (e.g., to inform a user that the end user device has been compromised).

In some implementations, the security platform may process thousands, millions, billions or more false account credentials stored on hundreds, thousands, millions, or more end user devices and provided to hundreds, thousands, millions, or more network devices. In such implementations, the security platform may concurrently process reports of tens, hundreds, thousands, or more uses of the false account credentials in a given time window.

In this way, several different stages of the process for monitoring a network based on distribution of false account credentials may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to monitor a network based on distribution of false account credentials. Finally, automating the process for monitoring a network based on distribution of false account credentials conserves computing resources (e.g., processor resources, memory resources, and/or the like) and/or network resources that would otherwise be wasted in attempting to monitor a network to identify a bad actor in the network.

As indicated above, FIGS. 1A-1I are provided merely as examples. Other examples are possible and may differ from what was described with regard to FIGS. 1A-1I.

Figure 2:
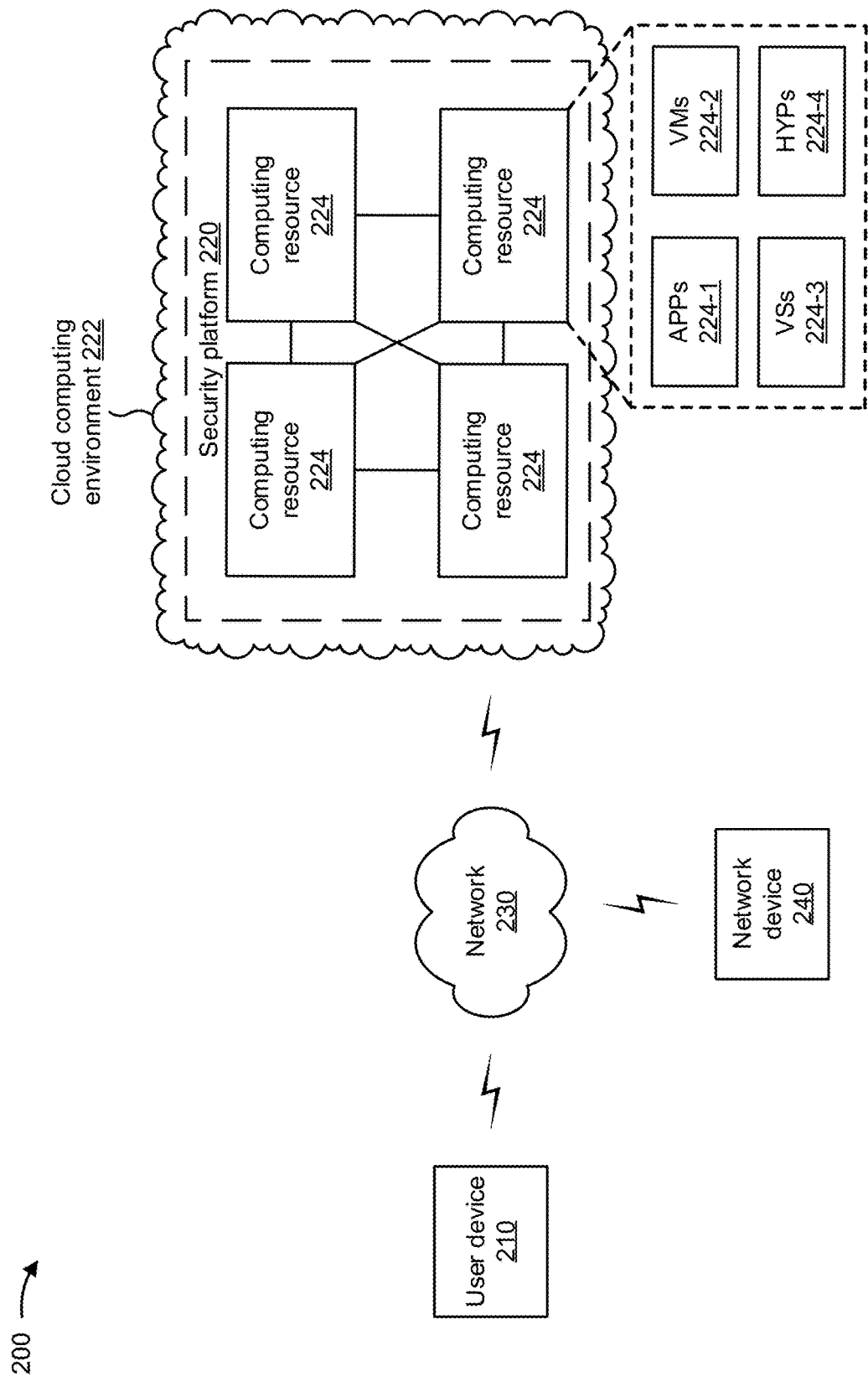
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a security platform 220, a network 230, and a network device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to one or more other devices of environment 200. In some implementations, user device 210 may be an endpoint device of network 230 and may be referred to as an end user device or an endpoint user device.

Security platform 220 includes one or more devices capable of network monitoring based on distribution of false account credentials. In some implementations, security platform 220 may be designed to be modular such that certain software components may be swapped in or out depending on a particular need. As such, security platform 220 may be easily and/or quickly reconfigured for different uses. In some implementations, security platform 220 may receive information from and/or transmit information to one or more other devices of environment 200.

In some implementations, as shown, security platform 220 may be hosted in a cloud computing environment 222. Notably, while implementations described herein describe security platform 220 as being hosted in cloud computing environment 222, in some implementations, security platform 220 may not be cloud-based (i.e., may be implemented outside of a cloud computing environment, such as within one or more server devices) or may be partially cloud-based.

Cloud computing environment 222 includes an environment that hosts security platform 220. Cloud computing environment 222 may provide computation, software, data access, storage, etc. services that do not require end-user knowledge of a physical location and configuration of system(s) and/or device(s) that hosts security platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host security platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with security platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of security platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices (e.g., one or more traffic transfer devices) capable of receiving, providing, storing, generating, and/or processing information described herein. For example, network device 240 may include a firewall, a router, a policy enforcer, a gateway, a switch, a hub, a bridge, a reverse proxy, a server (e.g., a proxy server), a security device, an intrusion detection device, a load balancer, or a similar device. In some implementations, network device 240 may receive information from and/or provide information to one or more other devices of environment 200. In some implementations, network device 240 may be a physical device implemented within a housing, such as a chassis. In some implementations, network device 240 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
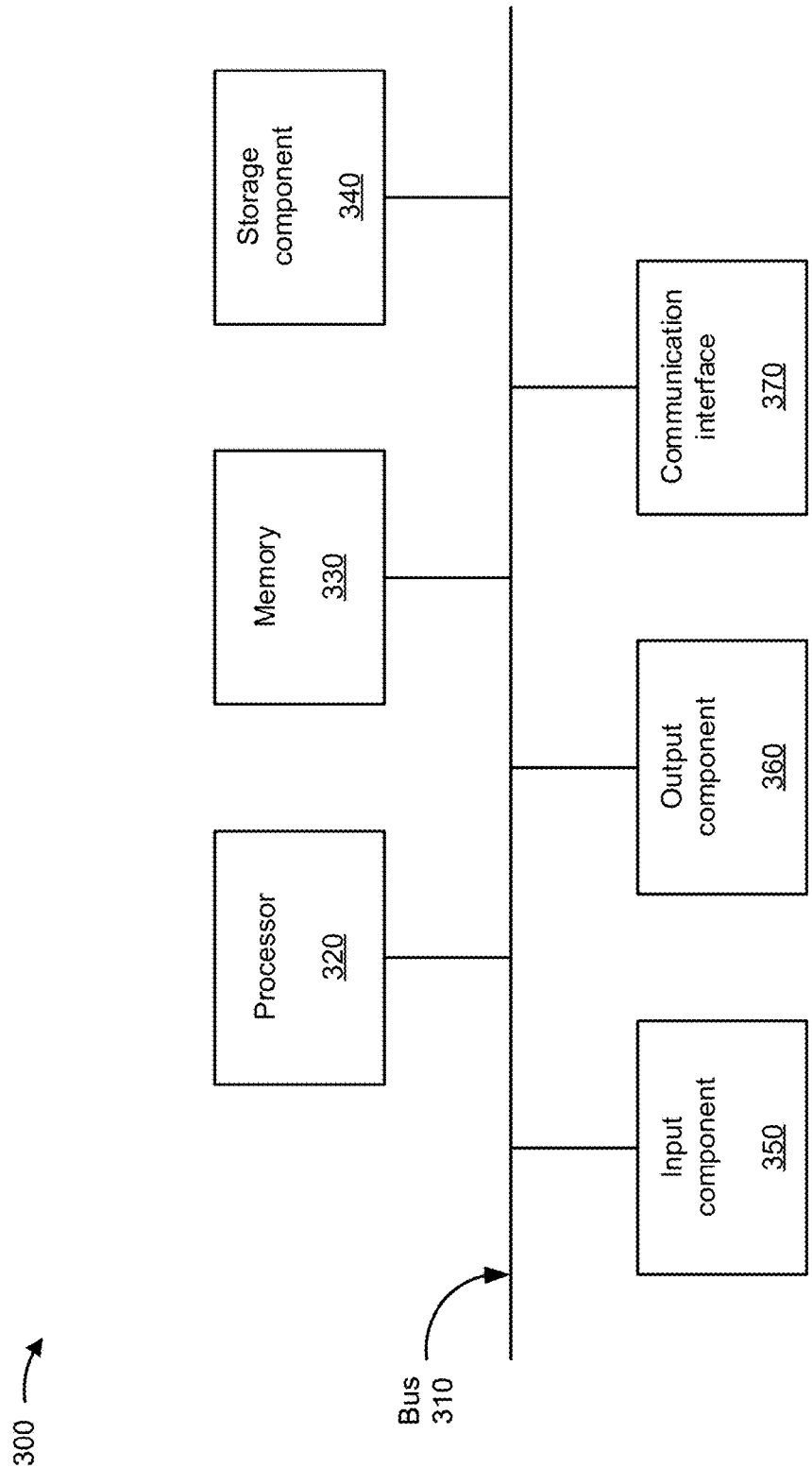
FIG. 3 is a diagram of example components of one or more devices of FIG. 2.

FIG. 3 is a diagram of example components of a device 300. Device 300 may correspond to user device 210, security platform 220, computing resource 224, and/or network device 240. In some implementations, user device 210, security platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
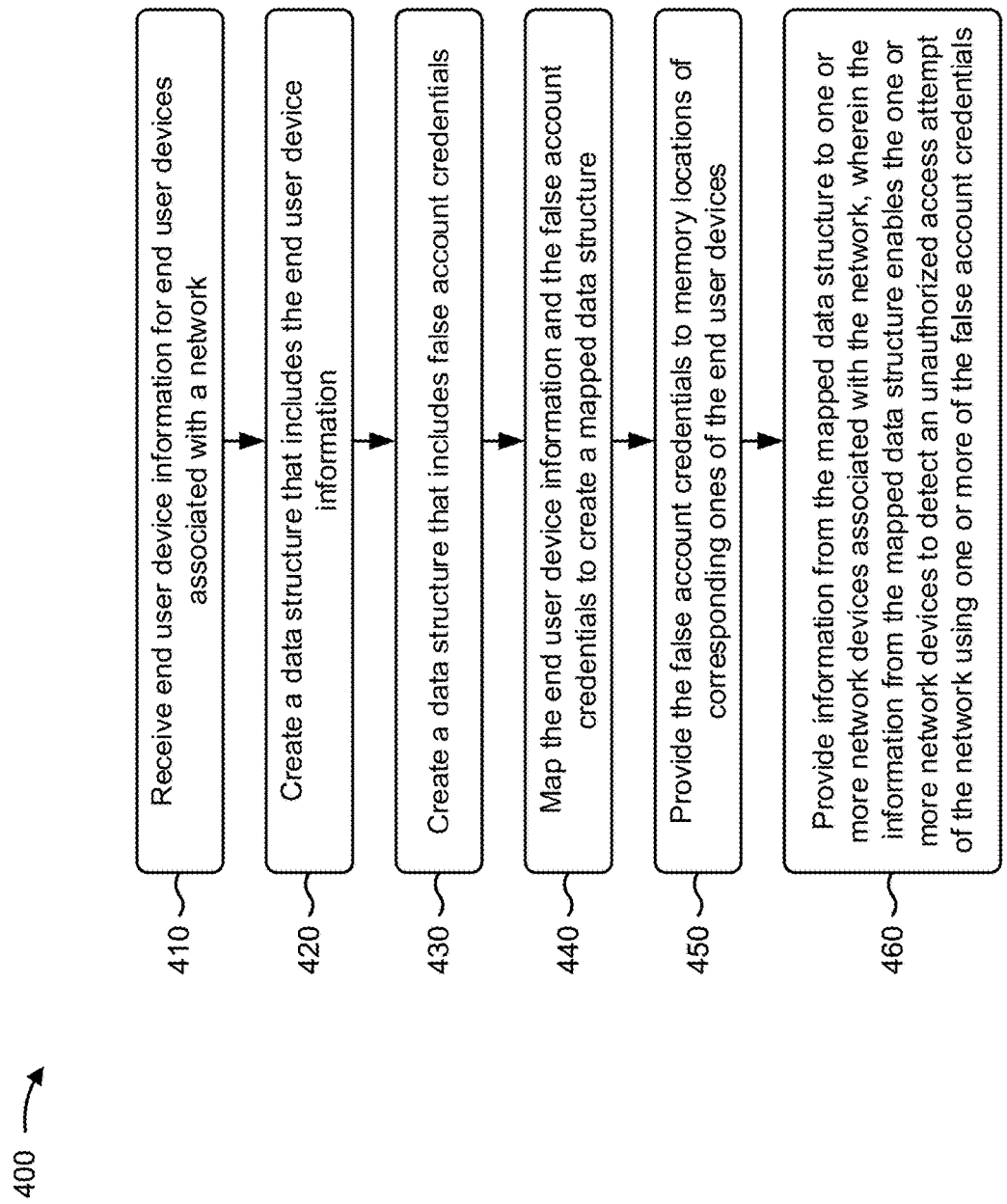

FIG. 4 is a flow chart of an example process 400 for determining and implementing egress peer engineering and ingress peer engineering destinations in a network. In some implementations, one or more process blocks of FIG. 4 may be performed by a security platform (e.g., security platform 220). In some implementations, one or more process blocks of FIG. 4 may be performed by another device or a group of devices separate from or including security platform 220, such as user device 210 and/or network device 240.

As shown in FIG. 4, process 400 may include receiving end user device information for end user devices associated with a network (block 410). For example, the security platform (e.g., using computing resource 224, processor 320, communication interface 370, and/or the like) may receive end user device information for end user devices associated with a network, as described above in connection with FIGS. 1A-2.

As further shown in FIG. 4, process 400 may include creating a data structure that includes the end user device information (block 420). For example, the security platform (e.g., using computing resource 224, processor 320, storage component 340, and/or the like) may create a data structure that includes the end user device information, as described above in connection with FIGS. 1A-2.

As further shown in FIG. 4, process 400 may include creating a data structure that includes false account credentials (block 430). For example, the security platform (e.g., using computing resource 224, processor 320, memory 330, and/or the like) may create a data structure that includes false account credentials, as described above in connection with FIGS. 1A-2.

As further shown in FIG. 4, process 400 may include mapping the end user device information and the false account credentials to create a mapped data structure (block 440). For example, the security platform (e.g., using computing resource 224, processor 320, storage component 340, and/or the like) may map the end user device information and the false account credentials to create a mapped data structure, as described above in connection with FIGS. 1A-2.

As further shown in FIG. 4, process 400 may include providing the false account credentials to memory locations of corresponding ones of the end user devices (block 450). For example, the security platform (e.g., using computing resource 224, processor 320, communication interface 370, and/or the like) may provide the false account credentials to memory locations of corresponding ones of the end user devices, as described above in connection with FIGS. 1A-2.

As further shown in FIG. 4, process 400 may include providing information from the mapped data structure to one or more network devices associated with the network (block 460). For example, the security platform (e.g., using computing resource 224, processor 320, memory 330, communication interface 370, and/or the like) may provide information from the mapped data structure to one or more network devices associated with the network, as described above in connection with FIGS. 1A-2. In some implementations, the information from the mapped data structure may enable the one or more network devices to detect an unauthorized access attempt of the network using one or more of the false account credentials.

Process 400 may include additional implementations, such as any single implementation or any combination of implementations described below and/or in connection with one or more other processes described elsewhere herein.

In some implementations, the security platform may receive, from the one or more network devices, information indicating the unauthorized access attempt of the network, and may perform one or more actions based on the information indicating the unauthorized access attempt of the network. In some implementations, the one or more actions may include providing an address, of an end user device, of the end user devices, and associated with the one or more of the false account credentials utilized to perform the unauthorized access attempt of the network, to a blacklist, preventing the end user device from accessing the network, modifying security rules associated with the one or more network devices, modifying rules for an intrusion prevention system associated with the network, and/or the like.

In some implementations, the end user device information, for an end user device of the end user devices, may include a media access control (MAC) address associated with the end user device, an Internet protocol (IP) address associated with the end user device, a serial number associated with the end user device, information identifying a manufacturer associated with the end user device, and/or the like.

In some implementations, the memory locations of the corresponding ones of the end user devices may include memory locations capable of being accessed by memory dumping tools. In some implementations, the security platform may receive, from the one or more network devices, an alert indicating the unauthorized access attempt of the network. In some implementations, each of the false account credentials may include a username and a password.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
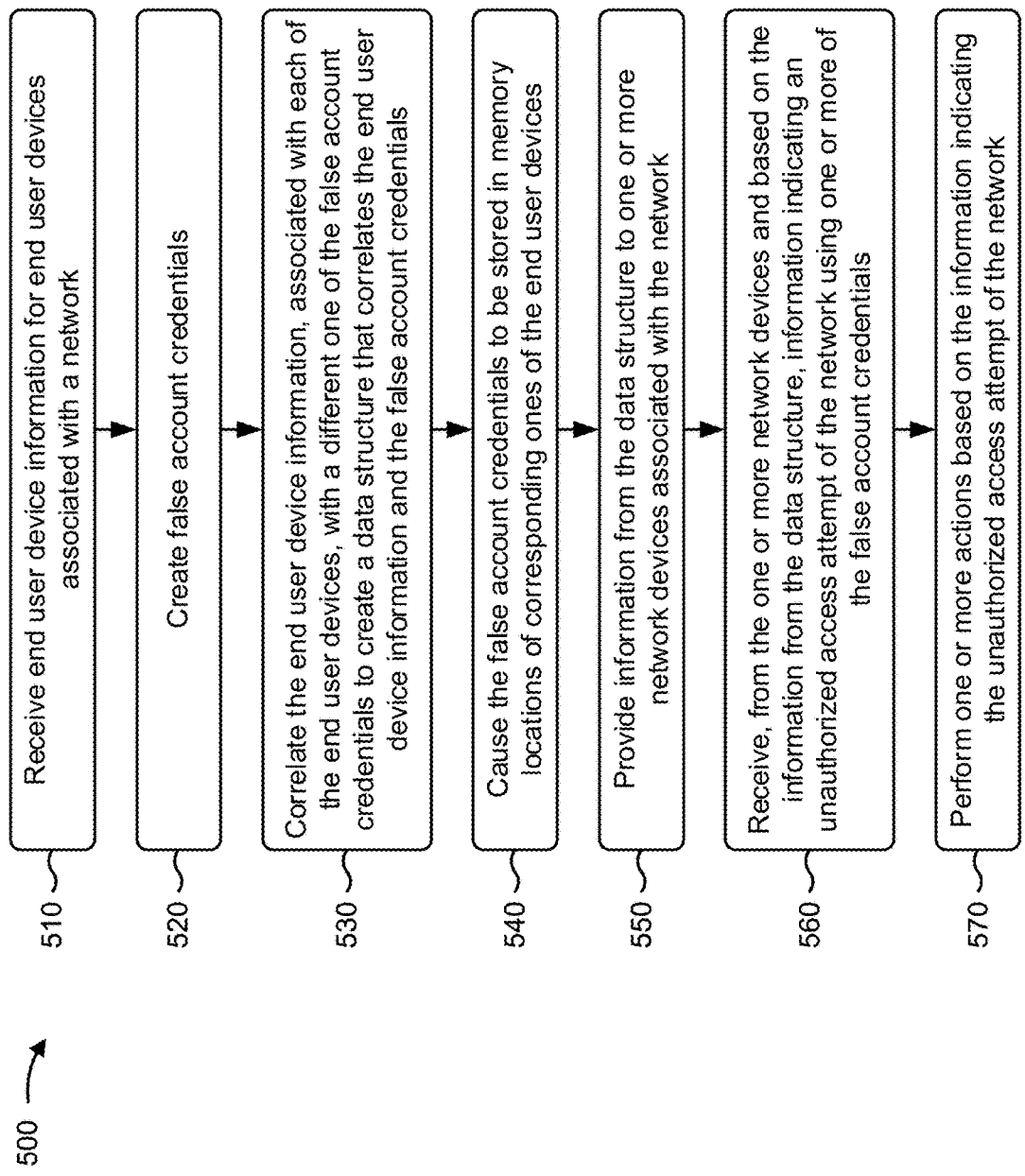

FIG. 5 is a flow chart of an example process 500 for determining and implementing egress peer engineering and ingress peer engineering destinations in a network. In some implementations, one or more process blocks of FIG. 5 may be performed by a security platform (e.g., security platform 220). In some implementations, one or more process blocks of FIG. 5 may be performed by another device or a group of devices separate from or including security platform 220, such as user device 210 and/or network device 240.

As shown in FIG. 5, process 500 may include receiving end user device information for end user devices associated with a network (block 510). For example, the security platform (e.g., using computing resource 224, processor 320, communication interface 370, and/or the like) may receive end user device information for end user devices associated with a network, as described above in connection with FIGS. 1A-2.

As further shown in FIG. 5, process 500 may include creating false account credentials (block 520). For example, the security platform (e.g., using computing resource 224, processor 320, memory 330, and/or the like) may create false account credentials, as described above in connection with FIGS. 1A-2.

As further shown in FIG. 5, process 500 may include correlating the end user device information, associated with each of the end user devices, with a different one of the false account credentials to create a data structure that correlates the end user device information and the false account credentials (block 530). For example, the security platform (e.g., using computing resource 224, processor 320, storage component 340, and/or the like) may correlate the end user device information, associated with each of the end user devices, with a different one of the false account credentials to create a data structure that correlates the end user device information and the false account credentials, as described above in connection with FIGS. 1A-2.

As further shown in FIG. 5, process 500 may include causing the false account credentials to be stored in memory locations of corresponding ones of the end user devices (block 540). For example, the security platform (e.g., using computing resource 224, processor 320, storage component 340, communication interface 370, and/or the like) may cause the false account credentials to be stored in memory locations of corresponding ones of the end user devices, as described above in connection with FIGS. 1A-2.

As further shown in FIG. 5, process 500 may include providing information from the data structure to one or more network devices associated with the network (block 550). For example, the security platform (e.g., using computing resource 224, processor 320, memory 330, communication interface 370, and/or the like) may provide information from the data structure to one or more network devices associated with the network, as described above in connection with FIGS. 1A-2.

As further shown in FIG. 5, process 500 may include receiving, from the one or more network devices and based on the information from the data structure, information indicating an unauthorized access attempt of the network using one or more of the false account credentials (block 560). For example, the security platform (e.g., using computing resource 224, processor 320, communication interface 370, and/or the like) may receive, from the one or more network devices and based on the information from the data structure, information indicating an unauthorized access attempt of the network using one or more of the false account credentials, as described above in connection with FIGS. 1A-2.

As further shown in FIG. 5, process 500 may include performing one or more actions based on the information indicating the unauthorized access attempt of the network (block 570). For example, the security platform (e.g., using computing resource 224, processor 320, communication interface 370, and/or the like) may perform one or more actions based on the information indicating the unauthorized access attempt of the network, as described above in connection with FIGS. 1A-2.

Process 500 may include additional implementations, such as any single implementation or any combination of implementations described below and/or in connection with one or more other processes described elsewhere herein.

In some implementations, the information from the data structure may enable the one or more network devices to detect the unauthorized access attempt of the network using the one or more of the false account credentials. In some implementations, when performing the one or more actions, the security platform may provide an address, of an end user device, of the end user devices, and associated with the one or more of the false account credentials utilized to perform the unauthorized access attempt of the network, to a blacklist, may prevent the end user device from accessing the network, may modify security rules associated with the one or more network devices, may modify rules for an intrusion prevention system associated with the network, and/or the like.

In some implementations, the end user device information, for an end user device of the end user devices, may include a media access control (MAC) address associated with the end user device, an Internet protocol (IP) address associated with the end user device, a serial number associated with the end user device, information identifying a manufacturer associated with the end user device, and/or the like. In some implementations, the memory locations of the corresponding ones of the end user devices may include memory locations capable of being accessed by memory dumping tools.

In some implementations, the security platform may receive, from the one or more network devices, an alert indicating the unauthorized access attempt of the network. In some implementations, each of the false account credentials may include a username, a password, a personal identification number, a keyword, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for determining and implementing egress peer engineering and ingress peer engineering destinations in a network. In some implementations, one or more process blocks of FIG. 6 may be performed by a security platform (e.g., security platform 220). In some implementations, one or more process blocks of FIG. 6 may be performed by another device or a group of devices separate from or including security platform 220, such as user device 210 and/or network device 240.

As shown in FIG. 6, process 600 may include receiving end user device information for an end user device associated with a network (block 610). For example, the security platform (e.g., using computing resource 224, processor 320, communication interface 370, and/or the like) may receive end user device information for an end user device associated with a network, as described above in connection with FIGS. 1A-2.

As further shown in FIG. 6, process 600 may include creating false account credentials (block 620). For example, the security platform (e.g., using computing resource 224, processor 320, memory 330, and/or the like) may create false account credentials, as described above in connection with FIGS. 1A-2.

As further shown in FIG. 6, process 600 may include associating the end user device information with the false account credentials to create information that associates the end user device information and the false account credentials (block 630). For example, the security platform (e.g., using computing resource 224, processor 320, storage component 340, and/or the like) may associate the end user device information with the false account credentials to create information that associates the end user device information and the false account credentials, as described above in connection with FIGS. 1A-2.

As further shown in FIG. 6, process 600 may include causing the false account credentials to be stored in a memory location of the end user device, based on the information that associates the end user device information and the false account credentials (block 640). For example, the security platform (e.g., using computing resource 224, processor 320, memory 330, communication interface 370, and/or the like) may cause the false account credentials to be stored in a memory location of the end user device, based on the information that associates the end user device information and the false account credentials, as described above in connection with FIGS. 1A-2.

As further shown in FIG. 6, process 600 may include providing the information that associates the end user device information and the false account credentials to one or more network devices associated with the network (block 650). For example, the security platform (e.g., using computing resource 224, processor 320, storage component 340, communication interface 370, and/or the like) may provide the information that associates the end user device information and the false account credentials to one or more network devices associated with the network, as described above in connection with FIGS. 1A-2.

As further shown in FIG. 6, process 600 may include receiving, from the one or more network devices and based on the information that associates the end user device information and the false account credentials, information indicating an unauthorized access attempt of the network using the false account credentials (block 660). For example, the security platform (e.g., using computing resource 224, processor 320, communication interface 370, and/or the like) may receive, from the one or more network devices and based on the information that associates the end user device information and the false account credentials, information indicating an unauthorized access attempt of the network using the false account credentials, as described above in connection with FIGS. 1A-2.

As further shown in FIG. 6, process 600 may include performing one or more actions based on the information indicating the unauthorized access attempt of the network (block 670). For example, the security platform (e.g., using computing resource 224, processor 320, communication interface 370, and/or the like) may perform one or more actions based on the information indicating the unauthorized access attempt of the network, as described above in connection with FIGS. 1A-2.

Process 600 may include additional implementations, such as any single implementation or any combination of implementations described below and/or in connection with one or more other processes described elsewhere herein.

In some implementations, the information that associates the end user device information and the false account credentials may enable the one or more network devices to detect the unauthorized access attempt of the network using the false account credentials. In some implementations, when performing the one or more actions, the security platform may provide an address, of the end user device associated with the false account credentials utilized to perform the unauthorized access attempt of the network, to a blacklist, prevent the end user device from accessing the network, modify security rules associated with the one or more network devices, modify rules for an intrusion prevention system associated with the network, and/or the like.

In some implementations, the security platform may receive, from the one or more network devices, an alert indicating the unauthorized access attempt of the network. In some implementations, the end user device information, for the end user device, may include a media access control (MAC) address associated with the end user device, an Internet protocol (IP) address associated with the end user device, a serial number associated with the end user device, information identifying a manufacturer associated with the end user device, and/or the like. In some implementations, each of the false account credentials may include a username, a password, a personal identification number, a keyword, and/or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a security platform that provides network monitoring based on distribution of false account credentials. For example, the security platform may receive end user device information for end user devices associated with a network, and may create false account credentials. The security platform may correlate the end user device information, associated with each of the end user devices, with a different one of the false account credentials to create a data structure that correlates the end user device information and the false account credentials. The security platform may cause the false account credentials to be stored in memory locations of corresponding ones of the end user devices, and may provide information from the data structure to one or more network devices associated with the network. The security platform may receive, from the one or more network devices and based on the information from the data structure, information indicating an unauthorized access attempt of the network using one or more of the false credentials, and may perform one or more actions based on the information indicating the unauthorized access attempt of the network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors to:
     receive end user device information for end user devices associated with a network;
     create a data structure that includes the end user device information;
     create a data structure that includes false account credentials;
     map the end user device information and the false account credentials to create a mapped data structure;
     provide the false account credentials to memory locations of corresponding ones of the end user devices;
     provide information from the mapped data structure to a plurality of network devices associated with the network,
       the information from the mapped data structure enabling the plurality of network devices to detect an unauthorized access attempt of the network using one or more of the false account credentials; and
     receive, from a network device of the plurality of network devices, information identifying an end user device, of the end user devices, from which the one or more of the false account credentials were stolen.

2. The device of claim 1, wherein the one or more processors are further to:
   perform one or more actions based on the information identifying the end user device.

3. The device of claim 2, wherein the one or more actions include one or more of:
   providing an address of the end user device, to a blacklist,
   preventing the end user device from accessing the network,
   modifying security rules associated with the plurality of network devices, or
   modifying rules for an intrusion prevention system associated with the network.

4. The device of claim 1, wherein the end user device information, for an end user device of the end user devices, includes one or more of:
   a media access control (MAC) address associated with the end user device,
   an Internet protocol (IP) address associated with the end user device,
   a serial number associated with the end user device, or
   information identifying a manufacturer associated with the end user device.

5. The device of claim 1, wherein the memory locations of the corresponding ones of the end user devices include memory locations capable of being accessed by memory dumping tools.

6. The device of claim 1, wherein the one or more processors are further to:
   receive, from a network device of the plurality of network devices, an alert indicating the unauthorized access attempt of the network.

7. The device of claim 1, wherein each of the false account credentials includes a username and a password.

8. A non-transitory computer-readable medium storing instructions, the instructions comprising:
   one or more instructions that, when executed by one or more processors, cause the one or more processors to:
     receive end user device information for end user devices associated with a network;

create false account credentials;
correlate the end user device information, associated with each of the end user devices, with a different one of the false account credentials to create a data structure that correlates the end user device information and the false account credentials;
cause the false account credentials to be stored in memory locations of corresponding ones of the end user devices;
provide information from the data structure to a plurality of network devices associated with the network,
wherein the information from the data structure enables the plurality of network devices to detect an unauthorized access attempt of the network using the one or more of the false account credentials;
receive, from a network device of the plurality of network devices, information identifying an end user device of the end user devices, from which one or more of the false account credentials were stolen; and
perform one or more actions based on the information identifying the end user device.

9. The non-transitory computer-readable medium of claim 8, wherein the one or more instructions, that cause the one or more processors to perform the one or more actions, cause the one or more processors to one or more of:
provide an address of the end user device to a blacklist,
prevent the end user device from accessing the network,
modify security rules associated with the plurality of network devices, or
modify rules for an intrusion prevention system associated with the network.

10. The non-transitory computer-readable medium of claim 8, wherein the end user device information, for an end user device of the end user devices, includes one or more of:
a media access control (MAC) address associated with the end user device,
an Internet protocol (IP) address associated with the end user device,
a serial number associated with the end user device, or
information identifying a manufacturer associated with the end user device.

11. The non-transitory computer-readable medium of claim 8, wherein the memory locations of the corresponding ones of the end user devices include memory locations capable of being accessed by memory dumping tools.

12. The non-transitory computer-readable medium of claim 8, wherein the instructions further comprise:
one or more instructions that, when executed by the one or more processors, cause the one or more processors to:
receive, from a network device of the plurality of the network devices, an alert indicating an unauthorized access attempt of the network.

13. The non-transitory computer-readable medium of claim 8, wherein each of the false account credentials includes one or more of a username, a password, a personal identification number, or a keyword.

14. A method, comprising:
receiving, by a device, end user device information for an end user device associated with a network;
creating, by the device, false account credentials;
associating, by the device, the end user device information with the false account credentials to create information that associates the end user device information and the false account credentials;
causing, by the device, the false account credentials to be stored in a memory location of the end user device, based on the information that associates the end user device information and the false account credentials;
providing, by the device, the information that associates the end user device information and the false account credentials to a plurality of network devices associated with the network,
the information that associates the end user device information and the false account credentials enables the plurality of network devices to detect an unauthorized access attempt of the network using one or more of the false account credentials;
receiving, by the device, from a network device of the plurality of network devices, information identifying the end user device from which the false account credentials were stolen; and
performing, by the device, one or more actions based on the information identifying the end user device.

15. The method of claim 14, wherein performing the one or more actions includes one or more of:
providing an address, of the end user device, to a blacklist,
preventing the end user device from accessing the network,
modifying security rules associated with the plurality of network devices, or
modifying rules for an intrusion prevention system associated with the network.

16. The method of claim 14, further comprising:
receiving, from a network device of the plurality of network devices, an alert indicating an unauthorized access attempt of the network.

17. The method of claim 14, wherein the end user device information, for the end user device, includes one or more of:
a media access control (MAC) address associated with the end user device,
an Internet protocol (IP) address associated with the end user device,
a serial number associated with the end user device, or
information identifying a manufacturer associated with the end user device.

18. The method of claim 14, wherein each of the false account credentials includes one or more of a username, a password, a personal identification number, or a keyword.

19. The non-transitory computer-readable medium of claim 8, wherein the memory locations include specific memory locations within operating systems of the end user devices.

20. The method of claim 14, wherein the memory location includes a specific memory location within an operating system of the end user device.

* * * * *

UNITED STATES PATENT AND TRADEMARK OFFICE
CERTIFICATE OF CORRECTION

PATENT NO. : 11,032,318 B2
APPLICATION NO. : 16/055665
DATED : June 8, 2021
INVENTOR(S) : Craig Dods Page 1 of 1

It is certified that error appears in the above-identified patent and that said Letters Patent is hereby corrected as shown below:

In the Claims

Claim 12:
Column 19 Line 54, change "receive, from a network device of the plurality of the" to --receive, from a network device of the plurality of--

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*